UNITED STATES PATENT OFFICE.

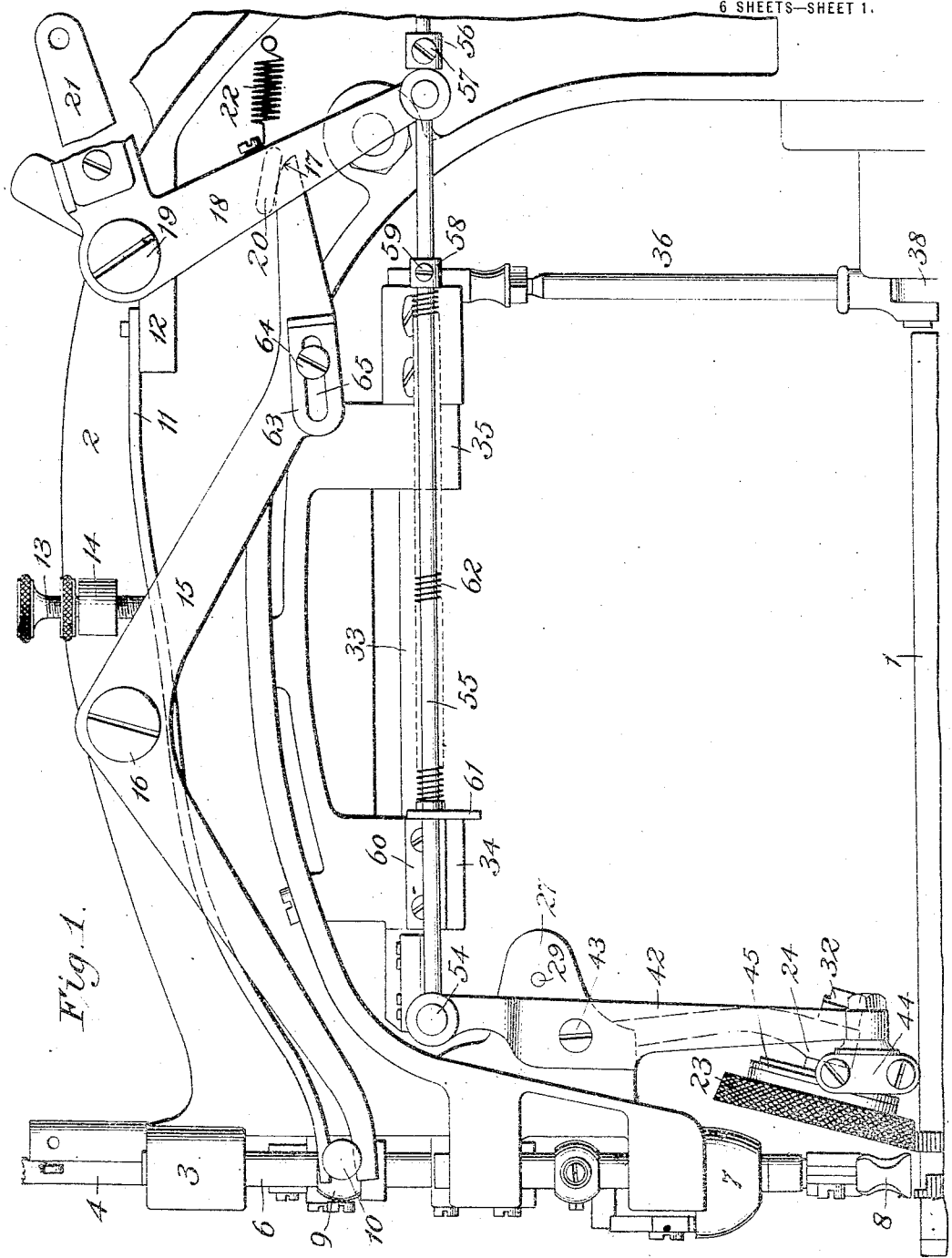

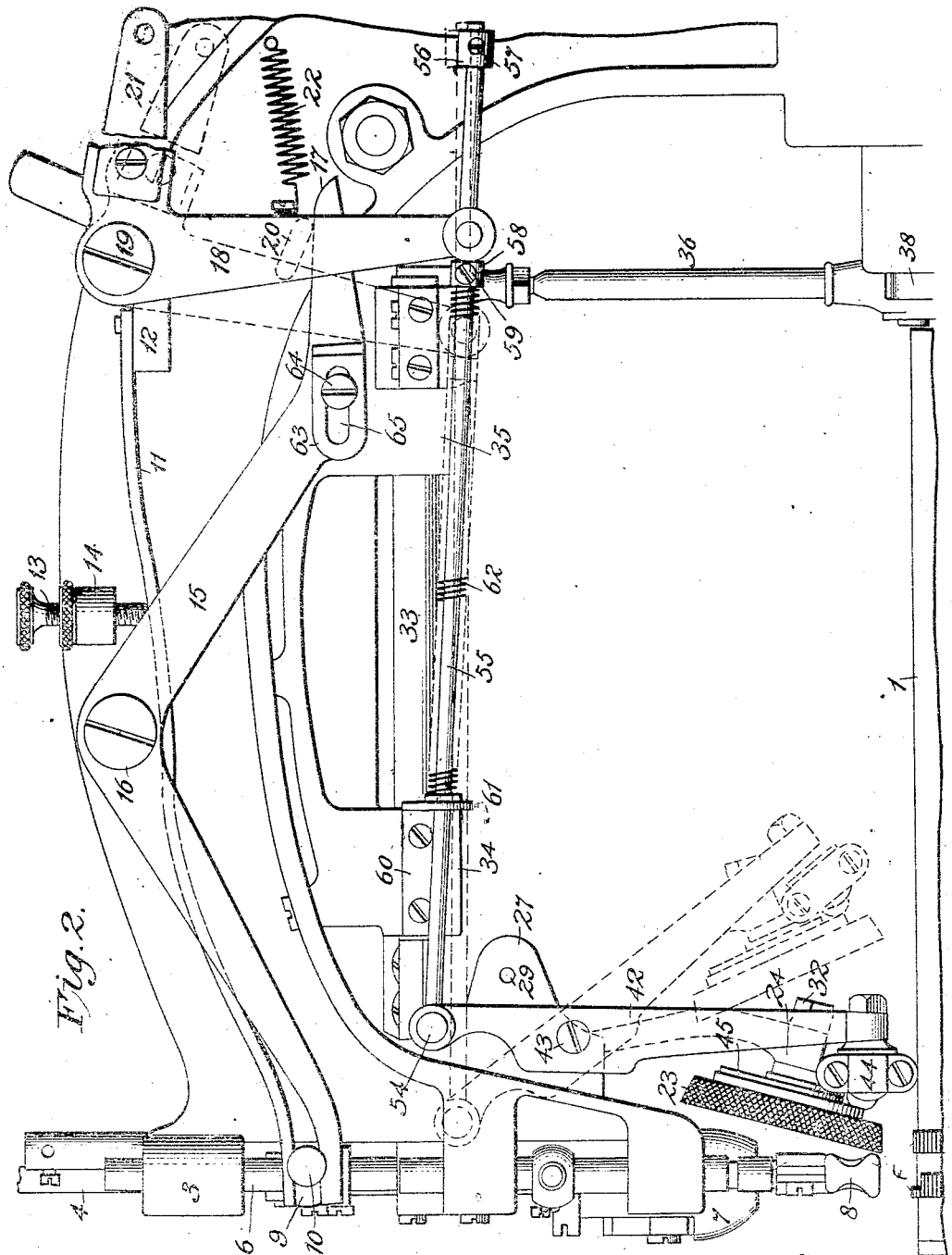

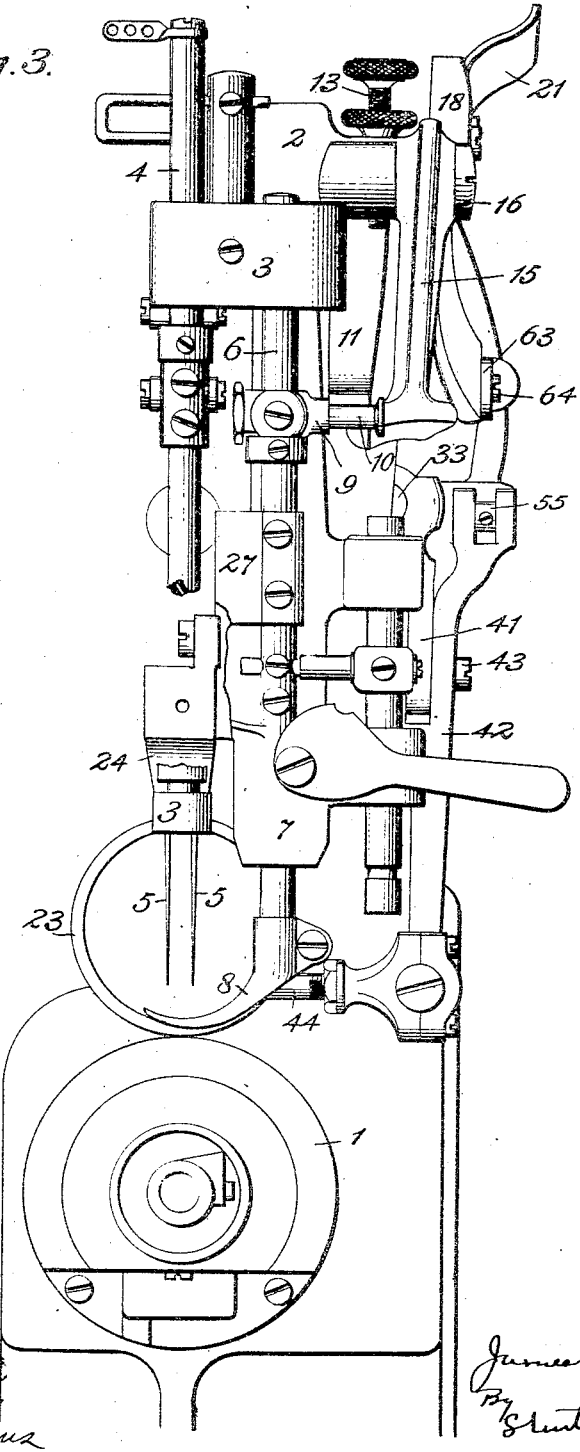

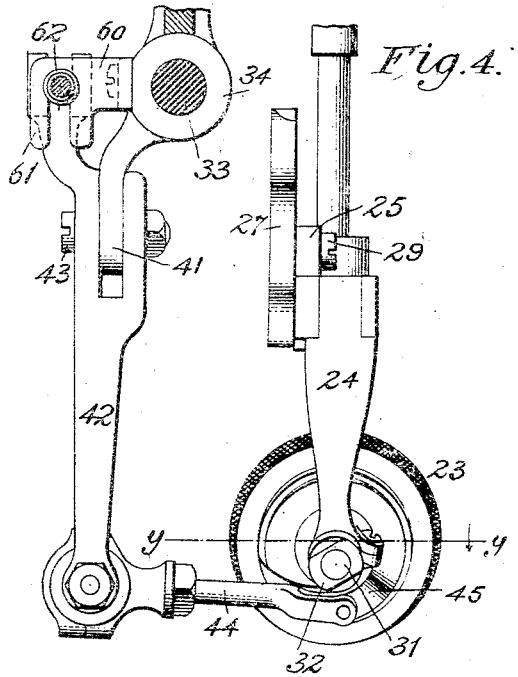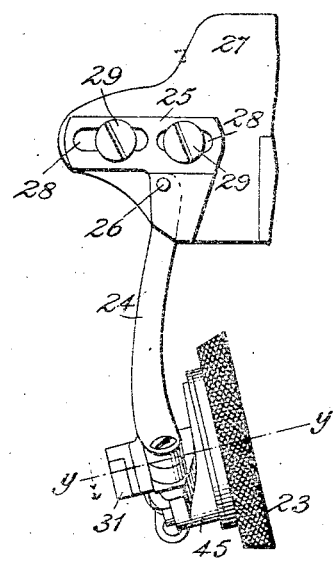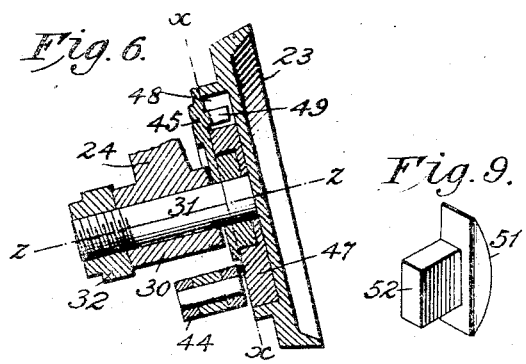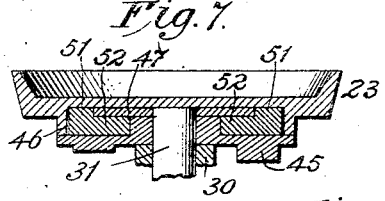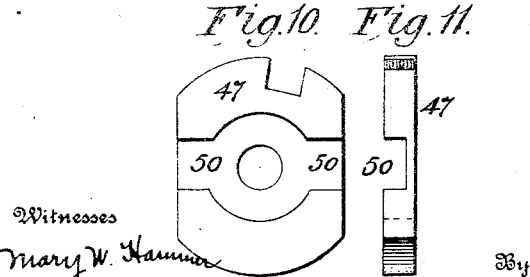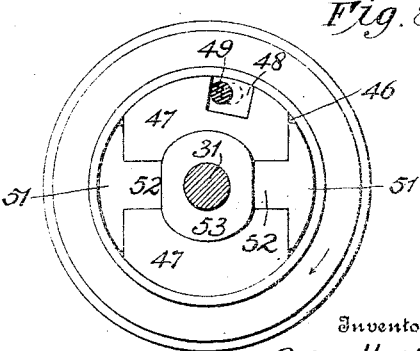

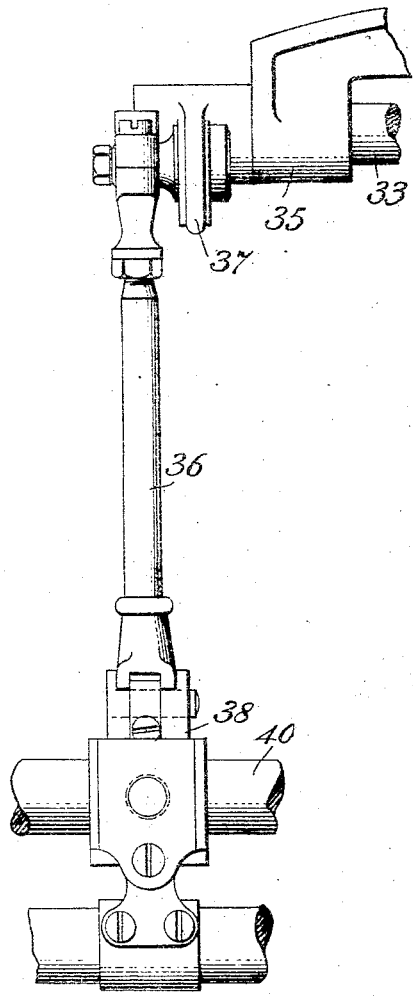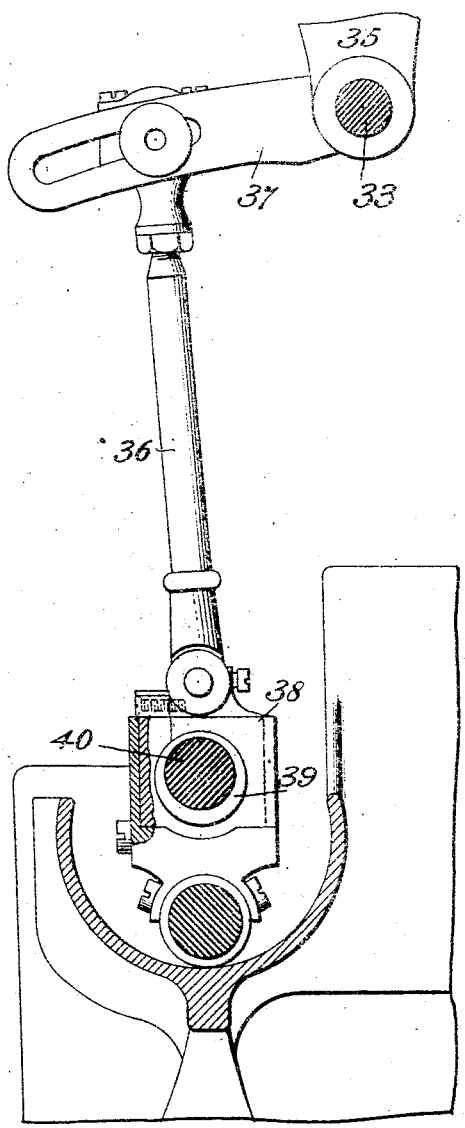

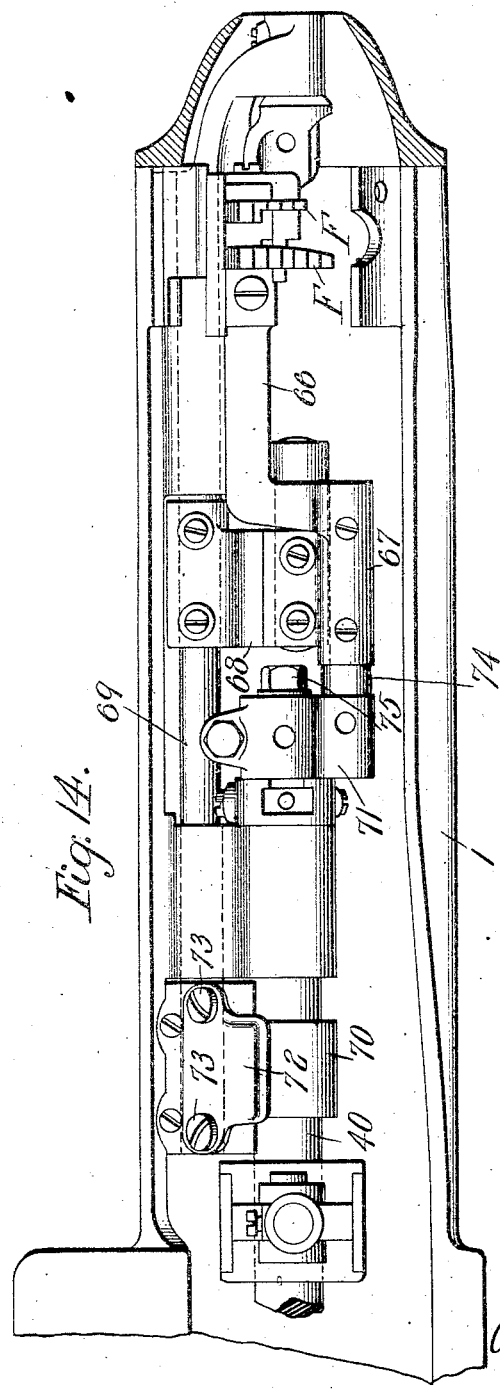

JAMES R. MOFFATT, OF CHICAGO, ILLINOIS, ASSIGNOR TO UNION SPECIAL MACHINE COMPANY, OF CHICAGO, ILLINOIS, A CORPORATION OF ILLINOIS.

SEWING-MACHINE.

1,145,605.    Specification of Letters Patent.    Patented July 6, 1915.

Application filed December 22, 1906. Serial No. 349,060.

*To all whom it may concern:*

Be it known that I, JAMES R. MOFFATT, a citizen of the United States, residing at Chicago, in the county of Cook, State of Illinois, have invented certain new and useful Improvements in Sewing-Machines, of which the following is a description, reference being had to the accompanying drawing and to the letters and figures of reference marked thereon.

My invention relates to improvements in sewing machines and more particularly to the means for holding the fabric while the same is being stitched.

An object of my invention is to construct a fabric holding means which shall aid in feeding the fabric to the stitching mechanism.

A further object of my invention is to provide a fabric holding means which is readily removed from the fabric so as to enable the operator to readily place the fabric in the machine or remove the same.

These and other objects will in part be obvious and will in part be more fully hereinafter described.

My invention consists in the novel parts and arrangements hereinafter shown and described.

In the accompanying drawings which show one embodiment of my invention:—Figure 1 is a rear side elevation of a sewing machine embodying my invention, the parts holding the fabric being shown as resting on the work support; Fig. 2 is a view similar to Fig. 1 with the presser holding members raised from the work support and showing in dotted lines the manner of moving the roller presser foot away from the stitching point; Fig. 3 is an end elevation of my machine, certain parts being broken away for the sake of clearness; Fig. 4 is a detail showing in side elevation the means for rotating the roller presser; Fig. 5 is a detail front view showing the roller presser foot and the means for adjustably supporting the same; Fig. 6 is a sectional view on the line *y, y* of Fig. 5; Fig. 7 is a sectional view on the line *z, z* of Fig. 6; Fig. 8 is a sectional view on the line *x, x* of Fig. 6; Fig. 9 is a detail perspective view of one of the gripping members of the friction clamp; Fig. 10 is a front view of the carrier for the gripping members; Fig. 11 is a side view of the carrier in Fig. 10; Fig. 12 is a detail view in side elevation showing the means for operating the roller presser; Fig. 13 is a side elevation of the part shown in Fig. 12, certain parts of the casing also being shown in section; and Fig. 14 is a plan view of the feeding mechanism.

In the drawings the bed plate 1 is of the usual cylindrical type carrying the feed dogs in its forward end. The overhanging arm 2 has suitable lugs 3, 3 at its forward end in which reciprocates a needle bar 4, carrying the needles 5, 5. Adjacent to the needle bar 4 is the usual presser bar 6 which is capable of reciprocating in the lugs 3 and 7. Said presser bar carries a foot 8 at its lower end, which coöperates with the feed dog and the work support 1 in holding and feeding the fabric to the stitching mechanism. The presser bar 6 is provided with a collar 9 having a lug 10 projecting therefrom. A suitable spring 11 mounted on a bracket 12 rests upon the upper surface of the lug 10, and normally tends to hold the presser foot upon the work support. The tension on the spring 11 may be adjusted by a suitable screw 13 passing through a lug 14 on the overhanging arm and bearing upon said spring 11 intermediate its ends. I have provided a lever for lifting the presser foot. Said lever 15 is pivoted to the overhanging arm at 16 and extends forwardly and backwardly underneath the lug 10. The other portion of the lever 15 extends toward the rear of the machine and has its end rounded off forming a cam surface 17. A lever 18 also pivoted on the head of the machine at a point 19 carries a lug 20 shown in dotted lines in Figs. 1 and 2. Said lever 18 is oscillated by an arm 21 which may be operated by hand or by a suitable treadle. The lever 18 and lug 20 are so disposed relative to the cam end of the lever 15 that as said lever 18 is swung about its pivot the lug 20 engages the lever 15 and gradually lifts the presser foot from the work support. It will be noted that the rear end of the lever 15 is so shaped that after the lug 20 reaches the position shown in Fig. 2, a further movement of the lever 18 to the position shown in dotted lines in Fig. 2 is permitted and during this latter movement of the lever 18, the lug 20 serves to hold the presser foot raised but does not lift the same farther from the work support. In order to hold the lever 18 out of engagement with the lever 15, I have provided a spring 22 which is secured to the lever 18 at one end and to the overhanging arm at the other end. I have also provided my machine with a roller presser foot 23 which is supported by an arm 24 shown in dotted lines in Figs. 1 and 2 and in full lines in Figs. 4 and 5. Said arm 24 is pivoted to a bracket 25 at 26. Said bracket 25 is adjustably secured to a projecting lug 27 carried by the presser bar of the machine by suitable slots 28, 28 and screws 29, 29. At the lower end of the arm 24 is an enlarged bearing 30 for the shaft 31 which is formed integral with and supports the roller presser foot 23. Said shaft 31 is secured in the bearing by a suitable nut 32. The roller presser foot is intermittently rotated by the rock shaft 33 which is supported by suitable lugs 34, 35 carried by the head of the machine. Said rock shaft 33 receives its oscillations from a link 36 which is adjustably secured at one end to an arm 37 formed integral to the rock shaft and is pivotally connected at its other end to a member 38 which is reciprocated by an eccentric 39 carried by the main shaft 40. The forward end of the rock shaft 33 has a depending arm 41. Pivoted to said arm 41 is an arm 42 which is forked so as to embrace the arm 41 and is connected thereto by a suitable bolt 43. The lower end of the arm 42 is operatively connected to the roller presser foot by means of a link 44. Said link 44 is pivoted at one end to the arm 42 and at its other end to the driving member for the friction grip of the roller presser foot. It will be noted that as the shaft 33 is oscillated the arm 41 moves therewith and the arm 42 will also partake of the oscillating movement of the shaft 33.

The specific means for intermittently rotating the roller presser foot is more clearly shown in Figs. 6 to 10 inclusive and consists of a driving member 45 which is freely mounted to oscillate about the shaft 31. This driving member 45 as above noted is pivotally connected to the link 44 and as the shaft 33 oscillates, its movement gives a backward and forward oscillating movement to the driving member 45 about the shaft 31. The roller presser foot is provided on the rear side with a circular recess 46. Within said recess 46 is mounted a carrier 47 for the gripping members. Said carrier is provided with a notch 48 which receives a pin 49 carried by the driving member 45. Said carrier 47 is provided with suitable recesses 50, 50 in each of which is mounted a gripping member 51. Said gripping members 51 have an outer curved surface which lies adjacent to the curved wall of the roller presser foot and said member also has an inwardly extending shank 52. The driving member 45 also carries a cam 53 which is formed integral therewith and extends between the shanks 52, 52 of the gripping members. The operation of my intermittent rotating device will be obvious. When the driving member 45 is rotated in the direction of the arrow in Fig. 8, the pin 49 is withdrawn slightly from the carrier 47 and the cam 53 engaging the shanks 52 of the gripping members 51 cause the said members 51 to be forced into gripping engagement with the roller foot and said roller foot will partake of the movements of the driving member. When however, the driving member is rotated in the opposite direction the pin 49 contacts with the carrier 47 before the cam 53 causes the members 51 to grip the roller foot and the carrier together with the gripping members 51, will be oscillated within the recess in the roller foot.

It will be noted that the supporting arm 24 is carried by a lug mounted on the presser bar and therefore, whenever the presser bar is lifted through the lever 15 the roller foot will also be lifted with the presser foot as shown in Fig. 2. The arm 42 which is pivotally connected to the arm 41 extends slightly above its pivotal point and is pivotally connected at 54 to a rod 55 which has a sliding engagement at its other end with the lever 18. The rod 55 is provided with a stop collar 56 which is adjustably secured to the rod by a set screw 57. A collar 58 is also adjustably secured to the rod 55 by a set screw 59. The rod 55 has its sliding engagement with the lever 18 between the collars 56 and 58. A bracket 60 secured to the lug 34 has a depending forked end 61 shown in Fig. 4 which surrounds the rod 55. A spring 62 encircles the rod 55 and engages at one end the stop collar 58 while at its other end said spring bears against the forked end of the bracket 60. When the lever 18 is oscillated to lift the presser bar and roller foot from the work support, the end of said lever engaging the rod 55 does not move the rod 55 until said end comes in contact with the stop collar 58, as shown in Fig. 2. When the lever has reached the position shown in Fig. 2, the lug 20 has served to lift the presser foot, and the roller presser from the fabric, and a further movement of the lever, as above noted, merely tends to hold said presser foot in its raised position, but does not lift the same farther. A further movement, however, of the lever 18 brings its lower end into engagement with the stop collar 58, and moves the rod 55 longitudinally against the action of the spring 62. This movement of the rod 55 oscillates the arm 42 and through its connection with the link 44, causes the roller foot to be moved laterally, swinging the arm 24 about its pivotal connection 26, as shown in Fig. 2. When the lever 18 is turned in the opposite direction, the spring 62 will immediately move the roller presser back into its normal position adjacent the presser foot, and as the lug 20 continues to hold the roller presser and presser foot raised until the lever 18 reaches the position shown in Fig. 2, it will be seen that the roller presser foot will be moved back into its normal position adjacent the presser foot, before the presser foot and roller presser are lowered upon the work support or fabric. The stop collar 58 serves to insure the proper returning of the roller presser foot.

I have provided an adjustable stop 63 for the lever 18, so that when said lever 18 is depressed the same engages said stop and prevents further movement of the lever. I have shown said stop 63, as carried by the lever 15, by means of a suitable screw 64, which passes through a slot 65 in said stop. It is obvious, however, that said stop may be mounted upon any of the members of the machine, so long as the same is located in the path of the lever 18.

The feed dog F, which is carried by the work support, operates through suitable feed slot therein. This feed dog is carried by the feed bar 66. The feed bar 66 is supported by a bracket 67, which is pivotally carried by the arm 68, rigidly secured to a shaft 69 mounted in suitable bearings in the work support. Said shaft 69 is oscillated by a cam 70 on the main shaft 40, by a fork 72, secured to the shaft 69 by screws 73, 73. This oscillation of the shaft 69 causes the bracket to rise and fall, thus giving the rising and falling movements to the feed dog F. The bracket 67, carrying the feed bar 66 is also provided with a projecting pin 74, which is connected to a crank pin 75, carried by the main shaft 40 by a link 71. The movements of the crank pin oscillate the bracket 67 on its pivotal connection with the arm 68, and thus gives to the feed dog F its backward and forward movement to feed the fabric. The crank pin 75 is adjustably mounted in a slot in the front end of the driving shaft, and by adjusting the same nearer to or farther from the center of the shaft, the length of feed movement may be adjusted.

It will be noted that by adjusting the connection between the link 36 and the lever 37, the amount of movement given the roller presser foot may be changed. The means for adjusting the main feed F is entirely independent of the means for adjusting the movements of the roller presser foot. These parts may be adjusted, therefore, so that the roller presser foot will have a longer duration of movement. This is an important feature, especially where operating upon heavy shoes or with very thin portions of leather in going around curves, and the like, as the thin stock has a tendency to stretch out under the pressure of the roller, and the presser foot. The movement of the roller presser foot after the main feed has finished, has a tendency to counteract this stretching process.

It will be obvious that minor changes in the details of the construction herein shown and described, may be made without departing from the spirit of my invention.

Having thus particularly described my invention, what I claim as new and desire to secure by Letters Patent is:—

1. The combination with a work support of a presser member coöperating therewith, means for raising said presser member, means independent thereof for moving said presser member laterally, and a common member for operating both of said means; substantially as described.

2. The combination with a work support of a presser member coöperating therewith, means for raising said presser member, means independent thereof for moving said presser member laterally, and a common member for operating said presser member raising means and for subsequently operating the means for moving the presser member laterally; substantially as described.

3. The combination with a work support of a presser bar, a presser foot carried thereby, a roller presser member adjacent to said presser foot and carried by said presser bar, means for simultaneously raising said presser foot and said roller presser member, and for subsequently moving said presser member laterally away from said presser foot; substantially as described.

4. The combination with a work support of a presser foot, a roller presser member located adjacent thereto, means for raising said roller presser member and for subsequently moving the same laterally away from the presser foot; substantially as described.

5. The combination with a work support of a roller presser member, means for yieldingly holding said roller presser member on said work support and means for raising said presser member and for subsequently moving the same laterally; substantially as described.

6. The combination with a work support of a roller presser member, means for yieldingly holding said roller presser member on said work support, means for raising said presser member and for subsequently moving the same laterally, and a stop for limiting the lateral movement of said presser member; substantially as described.

7. The combination with a work support, of a presser foot, a roller presser member, means for adjustably supporting said roller presser member, means for raising said roller presser member and for moving the same laterally relative to the presser foot.

8. The combination with a work support of a presser foot, a roller presser member, means for adjustably supporting said roller presser member, means for moving said roller presser member laterally relative to said presser foot, and means for limiting the lateral movement of said presser member; substantially as described.

9. The combination with a work support of a presser foot, a presser bar carrying said presser foot, a roller presser member, means carried by said presser bar for supporting said roller presser member and means for moving said roller presser member laterally away from said presser foot comprising a lever and connections between said lever and said roller presser member; substantially as described.

10. The combination with a work support of a presser foot, a presser bar for supporting said presser foot, a roller presser member, means carried by said presser bar for supporting said roller presser member and means for raising said presser bar and for moving said roller presser member laterally away from said presser foot comprising a lever and connections between said lever and said roller presser member; substantially as described.

11. The combination with a work support of a presser foot, a presser bar for supporting said presser foot, a roller presser member, means carried by said presser bar for supporting said roller presser member and means for raising said presser bar and for moving said roller presser member laterally from said presser foot comprising a lever and connections between said lever and said roller presser member, a spring for returning said presser member to its normal position adjacent the presser foot; substantially as described.

12. The combination with a work support of a roller presser member, means for intermittently operating said roller presser member, means for raising said presser member and means for moving said presser member laterally at an angle to the line of feed and out of operative position; substantially as described.

13. The combination with a work support of a roller presser member, means for intermittently operating said roller presser member, means for raising said presser member, means for moving said presser member laterally out of the line of feed and out of operative position, a spring for returning said presser member to its normal position; substantially as described.

14. The combination with a work support of a presser foot, a roller presser member, means for intermittently rotating said roller presser member and means for moving said roller presser member laterally away from said presser foot and out of operative position; substantially as described.

15. The combination with a work support of a roller presser member, means for supporting said roller presser member, means for intermittently rotating said presser member and means operating through said rotating means for moving said presser member laterally; substantially as described.

16. The combination with a work support of a roller presser member, a rock shaft, means for oscillating said rock shaft, means connected with said rock shaft for rotating said presser member and means operating through said presser rotating means for moving said roller presser member laterally; substantially as described.

17. The combination with a work support of a roller presser member, means for supporting the same, means for raising said supporting means, means independent thereof for moving said presser member laterally; and a common member for operating both of said means; substantially as described.

18. The combination with a work support, a roller presser member, means for supporting the same, means for intermittently rotating said roller presser member, and means for moving said presser member laterally, comprising an operating arm, a rod pivotally connected to said operating arm, a spring for moving said rod in one direction and a lever for moving said rod in the opposite direction; substantially as described.

19. The combination with a work support, a presser bar, a roller presser member carried thereby, a lever for reciprocating said presser bar, and a second lever having a lug for engaging said first named lever for operating the same to raise the presser bar and means for moving said roller presser member laterally relative to said bar; substantially as described.

20. The combination with a work support, a presser bar, a roller presser member carried thereby, a lever for raising said presser bar and a second lever having a lug for engaging said first named lever for operating the same to raise the presser bar, and means operated by said second named lever for moving said roller presser member laterally; substantially as described.

21. The combination with a work support, a presser bar, a roller presser member carried thereby, a lever for raising said presser bar, a second lever having a lug for engaging said first named lever for operating the same to raise the presser bar, and means for moving said roller presser member laterally including a rod having a sliding connection, a second lever and stop collars carried by said rod whereby said roller presser member may be moved laterally; substantially as described.

22. The combination with a work support of a roller presser member, means for supporting the same, and means for intermittently rotating said roller presser member including a driving member, a carrier, gripping members carried by said carrier, means carried by said driving member for moving said gripping members into contact with the roller presser member and means for raising said roller presser member; substantially as described.

23. The combination with a work support, a roller presser member, means for supporting the same, and means intermittently rotating said roller presser member including a driving member, a carrier, gripping members carried by said carrier and means carried by said driving member for moving said gripping members into contact with the roller presser member, and means carried by said driving member for engaging the carrier to move said carrier and gripping members independently by the roller presser member; substantially as described.

24. The combination with a work support, a pressed foot, a presser bar carrying the same, a lever for lifting said presser bar, a roller presser member mounted upon said presser bar, a rod for moving said roller presser member laterally, stop collars carried by said rod, a lever having free engagement with said rod, a lug carried by said lever and so disposed relative to the presser lifting lever that said lug carrying lever may operate to first lift the presser bar and then move the roller presser member laterally; substantially as described.

25. The combination with a work support, of a presser foot, a roller presser member adjacent said presser foot, means for simultaneously raising said presser foot and roller presser a defined distance above the work support, and means for subsequently moving said rolling presser away from the presser foot; substantially as described.

26. The combination in a sewing machine, a main feeding device operating intermittently to move the material forward, and an intermittently operated feeding roller presser foot, means to adjust said feeding movements and means for raising said roller presser from contact with said main feeding device, and means to move it laterally away from said main feeding device and away from the line of feed; substantially as described.

27. The combination of a work support, a roller presser member, and means for rotating said roller presser member including a flexible connection between said roller presser member and its operating means whereby said roller presser member may be moved laterally of itself and relative to its operating means.

28. The combination with a work support, of a roller presser member, means for rotating said roller presser member including a flexible connection between said roller presser and its operating means whereby said roller presser foot may be moved relative to its operating means, and means for moving said roller presser laterally of itself relative to the operating means; substantially as described.

29. The combination of a work support, of a roller presser member, means for rotating said roller presser member including a flexible connection whereby said roller presser can be raised above the work support, and a second flexible connection whereby said roller presser member can be swung laterally and upwardly; substantially as described.

30. The combination with a work support, of a roller presser member, and means to operate said roller presser member, and to move it laterally, a pivoted lever upon which said roller presser is mounted, and a second pivoted lever operating to swing the first pivoted lever on its pivotal point; substantially as described.

In testimony whereof I affix my signature, in presence of two witnesses.

JAMES R. MOFFATT.

Witnesses:
CHESTER McNEIL,
ROBERT TAUBERT.